United States Patent [19]

Goeppner et al.

[11] 4,118,972

[45] Oct. 10, 1978

[54] APPARATUS FOR DETECTING LEAKS IN COMPOSITE PACKAGES

[75] Inventors: Ronald R. Goeppner, St. Louis; William M. Kuehne, Chesterfield; Timothy D. Russell, St. Louis, all of Mo.

[73] Assignee: Container Corporation of America, Chicago, Ill.

[21] Appl. No.: 829,567

[22] Filed: Aug. 31, 1977

[51] Int. Cl.² .............................................. G01M 3/32
[52] U.S. Cl. .......................................... 73/40; 73/49.2
[58] Field of Search ................... 73/40, 45.3, 49.2, 40.7

[56] References Cited

U.S. PATENT DOCUMENTS

| | | | |
|---|---|---|---|
| 3,342,990 | 9/1967 | Barrington et al. | 73/40.7 X |
| 3,369,392 | 2/1968 | Christensson | 73/49.2 |
| 3,389,811 | 6/1968 | Frank | 73/45.3 X |
| 3,461,716 | 8/1969 | Thomson | 73/45.3 X |
| 3,616,680 | 11/1971 | Schrader | 73/40.7 |
| 3,824,840 | 7/1974 | Amberg | 73/45.3 |

FOREIGN PATENT DOCUMENTS

| | | | |
|---|---|---|---|
| 117,156 | 6/1956 | U.S.S.R. | 73/45.3 |
| 127,463 | 1960 | U.S.S.R. | 73/45.3 |

Primary Examiner—Richard C. Queisser
Assistant Examiner—Joseph W. Roskos
Attorney, Agent, or Firm—Carpenter & Ostis

[57] ABSTRACT

Apparatus for testing leakage of composite packages is disclosed. The apparatus includes a hollow arbor for supporting a composite package to be tested for leakage, the open end of the composite package being sealed to a support for the hollow arbor, the interior of the latter being connected to means for placing pressure on the interior of the composite package at a value less than ambient, and being subsequently connected to means for measuring leakage in the container while being supported on the arbor.

3 Claims, 4 Drawing Figures

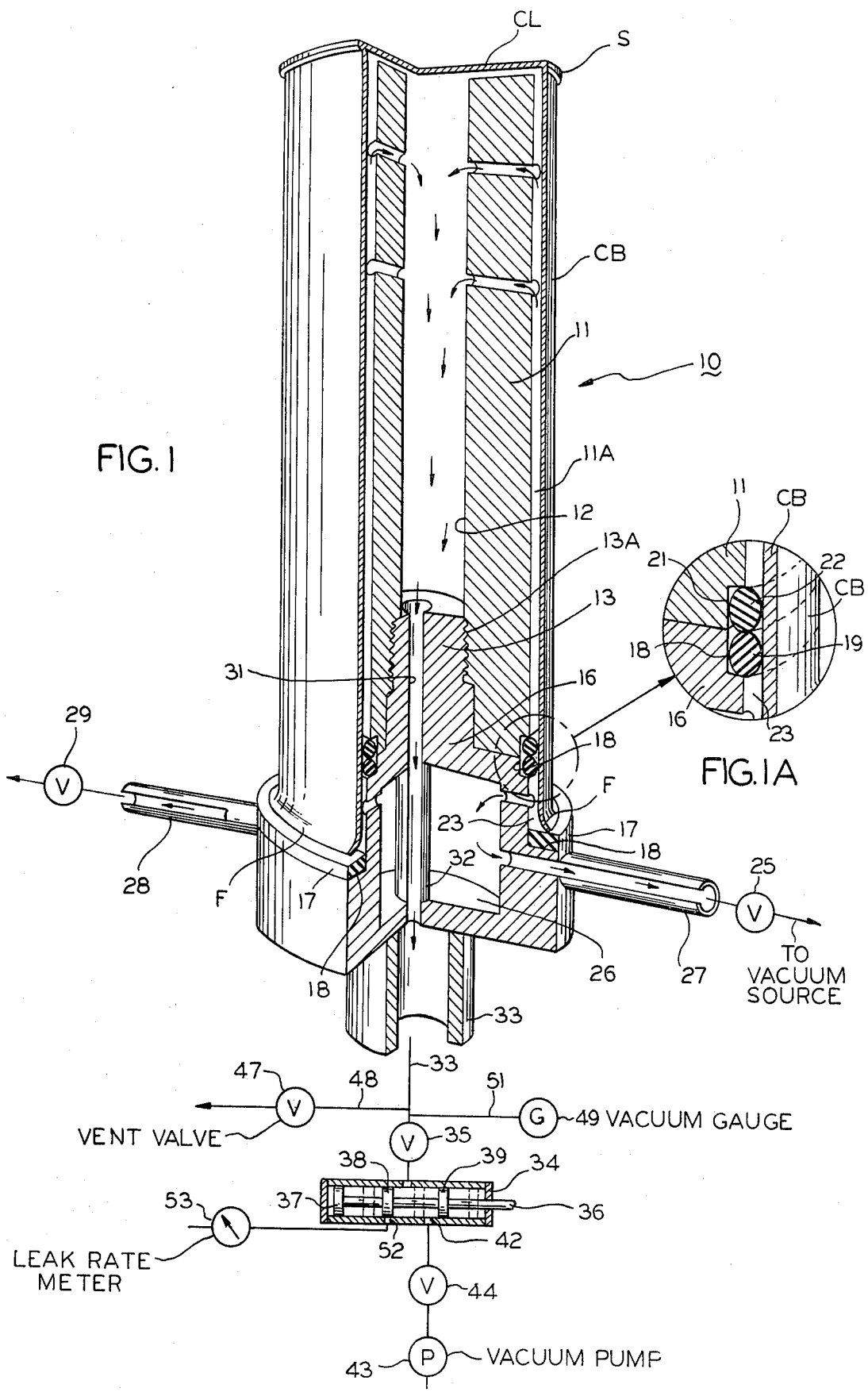

APPARATUS FOR DETECTING LEAKS IN COMPOSITE PACKAGES

BACKGROUND OF THE INVENTION

The present invention relates to the provision of apparatus for testing for leakage, either through an opening or by permeation, in a composite package which is defined as a semi-rigid container body, deriving its strength principally from one or more cylindrically wound fibreboard plies or laminations thereof, and having closures attached to one or both ends thereof to contain a product. The apparatus of the present invention can be used to test the entire package, not just the body or closures.

The composite packages are generally random tested by subjecting the interior of the package to a pressure less than ambient and then exposing the exterior of the package to an inert gas, such as helium, for example, and connecting the interior of the package to apparatus responsive to the gas by leakage thereof into the package, and measuring such leakage.

SUMMARY OF THE INVENTION

With the foregoing consideration in mind it is the purpose of this invention to provide an efficient apparatus for the testing of composite packages for leakage, particularly those made of fibreboard or paperboard and having end closures.

THE DRAWINGS

FIG. 1 is an isometric view of the invention structure with a composite package thereon, part of the structure being shown in section and illustrating schematically a test circuit connected thereto;

FIG. 1A is an enlarged scale view of a portion of the structure seen in FIG. 1;

Figure 3:
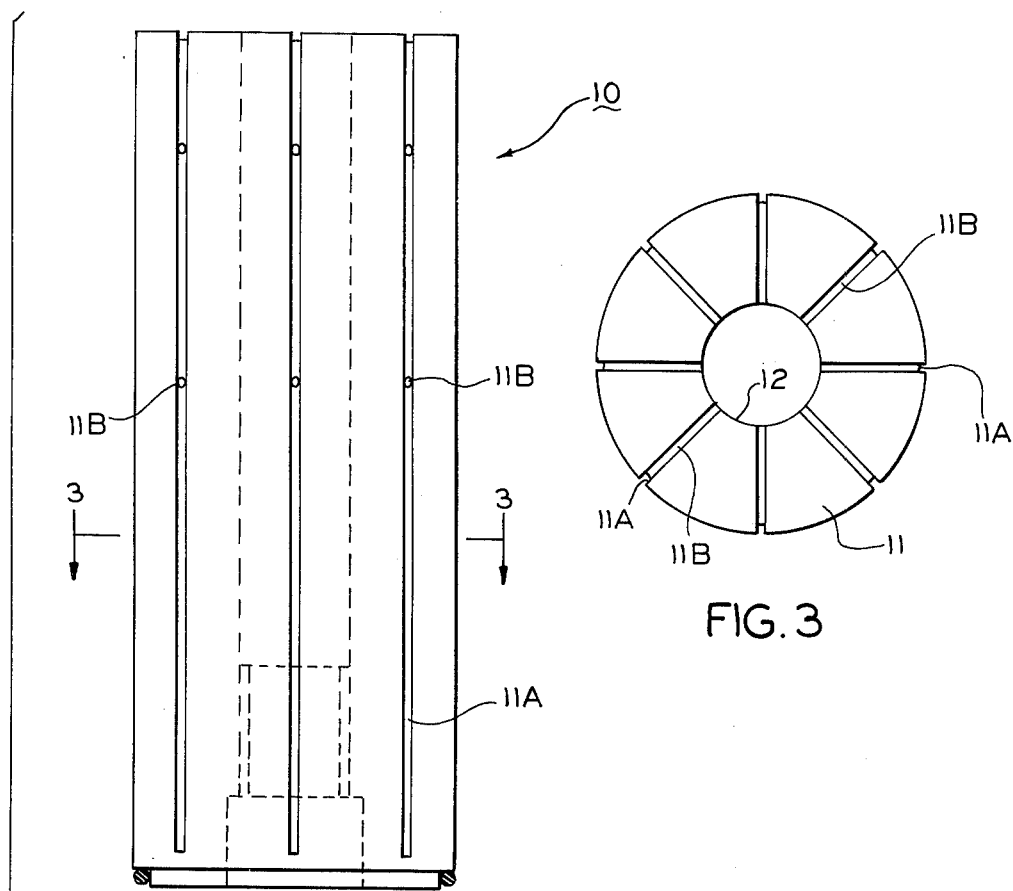
FIG. 3 is a transverse section taken along the line 3—3 of FIG. 2 looking in the direction of the arrows.
Figure 2:
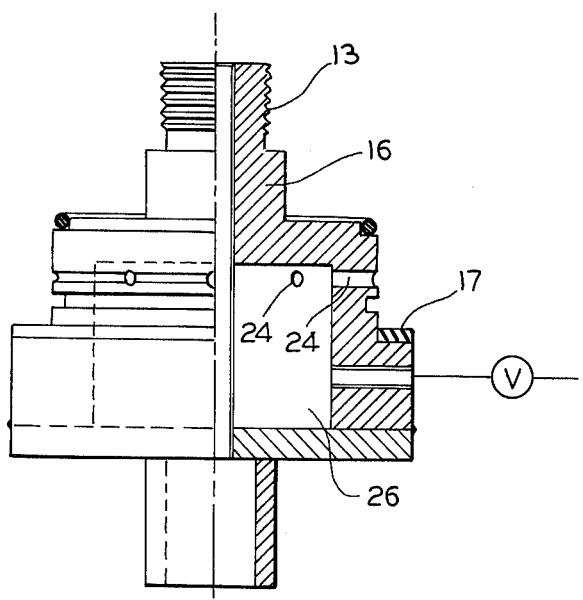
FIG. 2 is an exploded elevational view of the invention structure, parts being shown in section.

The leakage testing apparatus is referred to generally by the reference numeral 10 and includes a hollow support arbor 11 having a central longitudinal passage 12 therein, the lower end of passage 12 being threaded at 13A to engage a ferrule or boss 13 threaded at 13A whereby arbor 11 can be held to a support 16.

A composite package has an end closure CL attached to the upper end of composite package at a seam S. The lower end of composite package has a flange F seated on an annular gasket 17 resting upon an external shoulder 18 on support 16.

Support 16 has a seat 18 for an O-ring seal 19 and the lower end of arbor 11 has a lowermost seat 21 for an O-ring seal 22 engaged with seal 19, both bearing against the interior face of composite package, seals 19 and 22 and gasket 17 defining an annular chamber 23 in turn connected by radial passageways 24 to a chamber 26 in support 16.

Arbor 11 has vertical grooves 11A and these are connected by radial passageways 11B to the passage 12 in arbor 11. Such passageways aid in subjecting the inside of composite package to a pressure less than ambient for a purpose as will appear.

Chamber 26 is connected to a vacuum source shown in FIG. 1 by a line 27, and chamber 26 is enabled to be vented to ambient by a line 28 having a vent valve 29 therein. When valve 29 is closed and vacuum source is operable through 25, composite package is held in position on annular gasket 27 and against O-ring seals 19 and 22.

Structure is provided for subjecting, as desired, the remainder of composite package to a pressure less than ambient, and surrounding composite package with a gas which may pass through the composite package if in fact the composite package leaks for some reason. To this end support 16 has a passageway 31 therethrough coextensive with passage 12 and coextensive with a passageway 32 within annular chamber 26, passageway 32 being connected to a test line 33 which is part of a test circuit to be described.

Test line 33 has a spool valve 34 therein with spool 36 therein having spaced lands 37, 38 and 39. A port 41 in valve 34 is connected to line 33 and through a shutoff valve 35 between lands 38 and 39 to a port 42 in turn connected to a vacuum pump 43 through a shutoff valve 44.

When it is desired to test the seal integrity of composite package, it is placed on the arbor 11 and seated on gasket 17 and over O-ring seals 19 and 22. A vent valve 47 is connected in a line 48 branching from test line 33 and a vacuum gauge 49 is likewise connected in a line 51 branching from test line 33.

Spool valve 34 is in the position shown and valves 35 and 44 are opened when vacuum pump 43 is operated. When a desired subambient pressure is indicated by gauge 49, spool valve 34 is actuated with lands 37, 38 and 39 shifted to the dotted line position.

At this time a port 52 in valve 34 is unlapped and a leak rate meter 53 is connected to port 52 and is now subject to the subambient pressure interior of composite package. The exterior of composite package is now exposed to a gas, such as helium, meter 53 being responsive to leakage of such gas through composite package. If the meter 53 does not change reading, or such change is within permissible limits, composite package is acceptable.

When the test is completed valve 34 is actuated to its original position, valve 49 closed and vent valve 47 opened. Valve 29 is then opened relieving the pressure in chamber 26 for release of the composite package.

It should be borne in mind that the test described is made only after calibration of meter by use of a test container of known properties. The test and calibrating procedure of meter 53 with such a test container is not described as such is a common practice in the use of a test instrument.

We claim:

1. In apparatus for testing leakage of a composite package:
   (a) a hollow arbor for supporting a composite package including means for connecting the interior of said arbor to the interior of said composite package;
   (b) a support for said arbor including a passageway therein connecting the interior of said arbor to means for placing pressure less than ambient on the interior of said composite package;
   (c) said support being provided with a gasket sealing the open end of said composite package and with sealing means disposed axially of said gasket to define a chamber connected to a pressure less than ambient to enable the remainder of the interior of said package to be subjected to pressure less than ambient;

(d) means for connecting the interior of said hollow arbor and said composite package to means for measuring leakage in said composite package.

2. Apparatus according to claim 1 wherein said sealing means is in juxtaposition with additional sealing means disposed on said arbor where said arbor is joined to said support.

3. Apparatus according to claim 1 wherein said chamber is in the form of hollow annulus surrounding the passageway in said support.

* * * * *